May 22, 1923.

A. NUANES

AEROPLANE PROPELLER

Filed Feb. 24, 1922

Inventor

Alfred Nuanes

By

Attorney

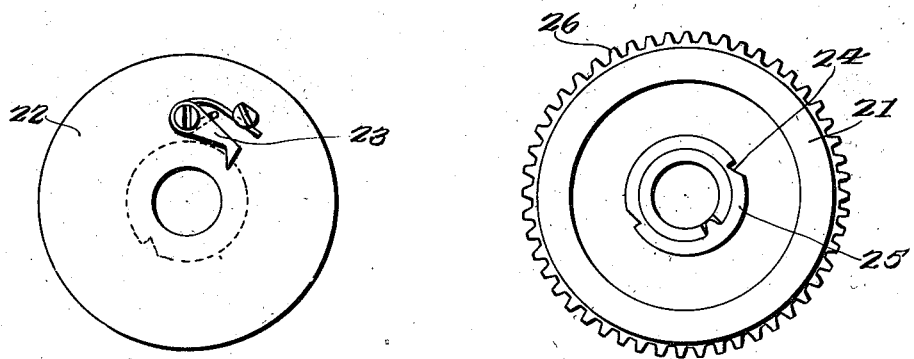
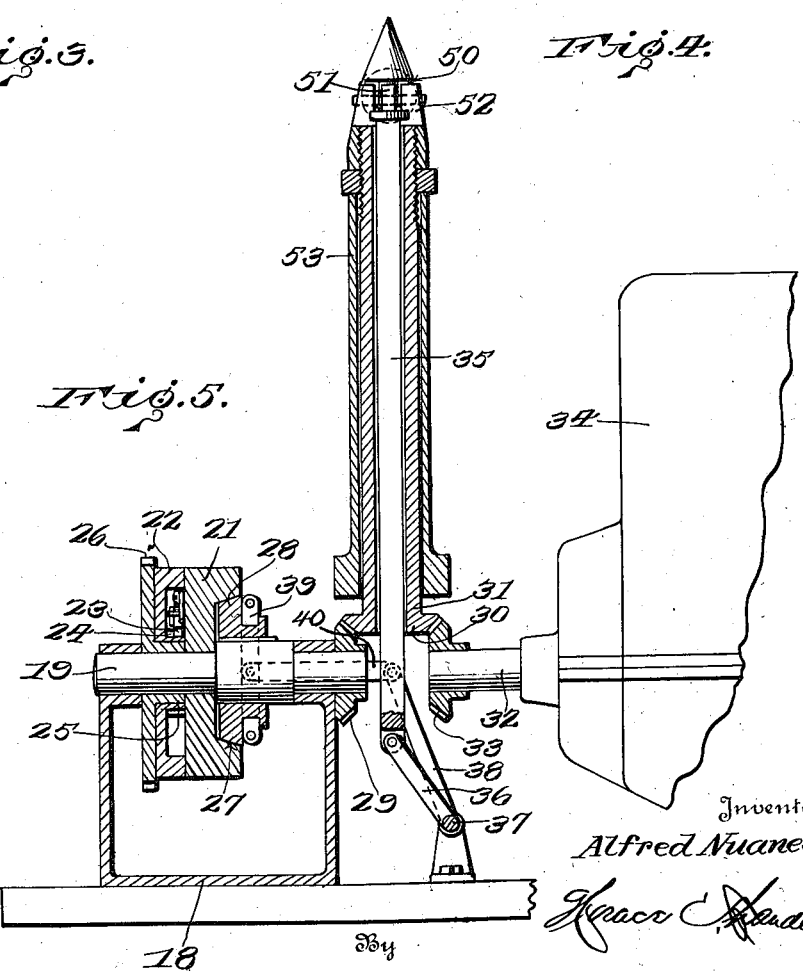

Patented May 22, 1923.

1,456,008

UNITED STATES PATENT OFFICE.

ALFRED NUANES, OF ALBUQUERQUE, NEW MEXICO.

AEROPLANE PROPELLER.

Application filed February 24, 1922. Serial No. 538,928.

*To all whom it may concern:*

Be it known that I, ALFRED NUANES, a citizen of the United States, residing at Albuquerque, in the county of Bernalillo, State of New Mexico, have invented certain new and useful Improvements in Aeroplane Propellers; and I do hereby declare the following to be a full, clear, and exact description of the invention, such as will enable others skilled in the art to which it appertains to make and use the same.

This invention relates to new and useful improvements in driving and controlling mechanisms, and particularly to driving and controlling mechanisms for aeroplane propellers.

The invention is especially adapted for use in connection with aeroplane propellers wherein the propeller is driven by two motors.

The particular object of the invention is to provide a mechanism whereby when one motor ceases to function properly, the drag thereof will not be imparted to the other motor and reduce the efficiency thereof.

Another object is to provide a mechanism of this character wherein is provided a governor for each of the motors which control clutches for throwing the individual motors into and out of operation, when one or the other of the motors ceases to function properly, and whereby the gear of the unclutched motor will run idly, being driven by the driven gear of the propeller shaft, from the properly operating motor.

Another object is to provide a propeller wherein the blades may be feathered as desired.

Other objects and advantages will be apparent from the following description when taken in connection with the accompanying drawings.

In the drawings:

Figure 3 is an elevation of the pawl carrying face of the driving gear of one of the motors.

Figure 4 is an elevation of the abutting portion of the driving gear.

Figure 5 is an enlarged vertical sectional view through the driving gear and clutch, on the line 5—5 of Figure 1.

Figure 1:
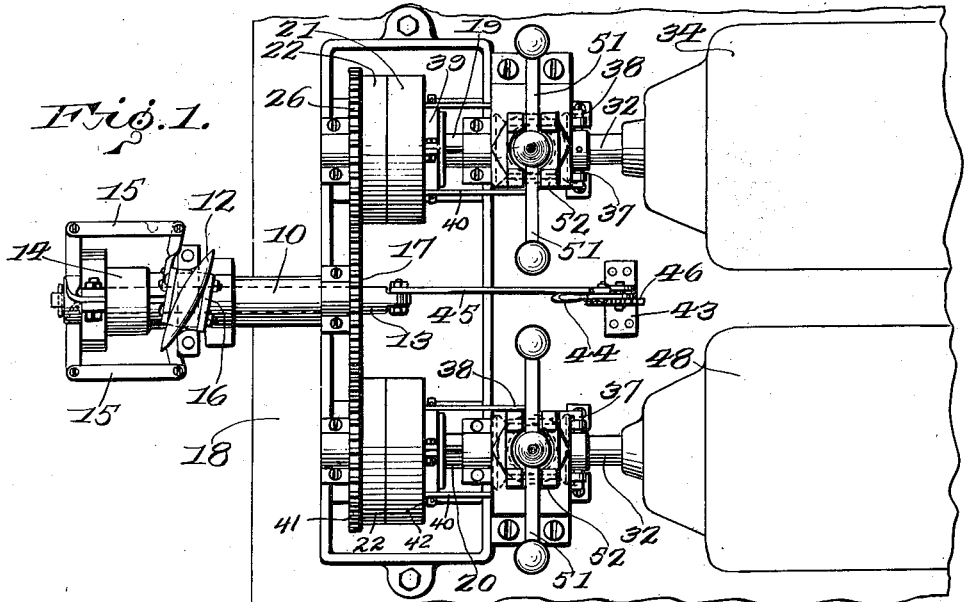
Figure 1 is a top plan view of the device, in connection with a propeller shaft and propeller.
Figure 2:
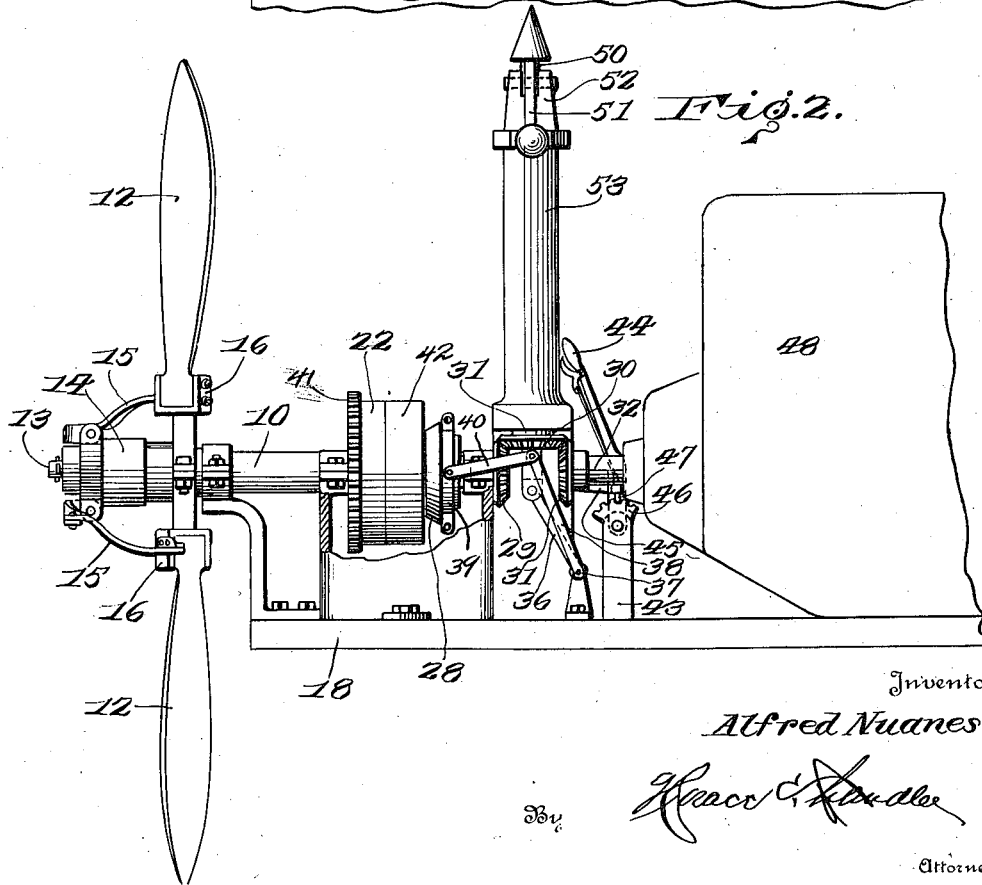
Figure 2 is a side elevation of the same.

When two motors or engines are used to drive a propeller of an aeroplane, it sometimes happens that one of the motors stops, or fails to properly function. In this event, the properly operating motor must drive the propeller, and at the same time be dragged by the dead motor, with the result that efficiency is reduced, and speed of the aeroplane greatly cut down. It is with the special object of preventing this drag of the dead motor, on the live and operating one, that the present invention is designed.

Referring particularly to the accompanying drawings, 10 represents the propeller shaft of the aeroplane 11, which has the propeller blades 12 mounted thereon, the mountings of said blades being so constructed and arranged that the blades may be rotated about their axes to change their angles of incidence to the air. Through the shaft 10 is a slidable shaft, shown at 13, and on the outer end of this shaft 13 is mounted a head 14, to which are pivotally connected the links 15. These links 15 extend forwardly, or rearwardly, in accordance with the position of the propeller on the aeroplane, and are pivotally connected to the propeller blade supporting blocks 16, so that as the shaft 13 is moved forwardly or rearwardly through the shaft 10, blades may be feathered as desired by the operator of the aeroplane. On the inner end of the shaft 10 there is fixed a gear 17, to which reference will be made later herein.

Mounted on a suitable base 18, at opposite sides of the shaft 10, are the shafts 19 and 20, and on the shaft 19 are loosely mounted the disks 21 and 22. Pivotally supported on the outer face of the disk 21 is a spring pressed pawl 23 for engagement with a notch 24 on the central boss 25, formed on the inner face of the disk 22, and whereby the two disks are driven in unison. The disk 22 is formed with a gear 26 which meshes with the gear 17, of the propeller shaft 10, and by means of which the said gear 17 is driven. The other face of the disk 21 is formed with a circular tapered recess 27 in which is engaged the correspondingly tapered clutch disk 28, which is splined on the shaft 19. On the shaft 19 there is mounted a bevel gear 29 which meshes with a bevel gear 30, carried by the lower end of the vertical hollow shaft 31. A second shaft 32, extends forwardly in tandem relation to the shaft 19, and has a bevel gear 33 which meshes with the said gear 31. This shaft 32 is the crank shaft of the motor 34. Slidable through the center of the shaft 31 is a shaft 35, the lower end of which is disposed between the gears 30 and 33, and is pivotally connected with an upwardly extending arm 36, on the rock shaft 37, mounted on the base 18. The ends of this shaft 37 are provided with the radial arms 38 which are connected with the ring 39, of the clutch disk 28, by means of the shifting links 40.

The mechanism described with respect to the shaft 19 is duplicated on the shaft 20, so that no detailed description thereof is necessary. The gear 41, of the disk 42, is, however, in mesh with the gear 17, at a point diametrically opposite to that at which the gear 26 meshes therewith. Thus both of the gears 26 and 41 drive the gear 18, and consequently the propeller shaft 10.

Mounted in a suitable bracket 43, is a lever 44, and pivotally connected to this lever, and to the adjacent end of the shaft 13, is a link 45, by means of which, when the lever is moved in one direction or the other, the head 15 will be moved to shift or feather the propeller blades through the rocking of the blocks 16. A segment 46 is engaged by a pawl 47, carried by the lever 44, to maintain the blades of the propeller in each of their shifted positions.

The shaft 20 is driven from the motor 48, by means identical with those described in connection with the motor 34, and through the governor 49.

The upper end of the shaft 35 is formed with a peripheral groove 50 in which are engaged the inner ends of the radial arms 51, which arms are pivotally carried by the bracket 52 on the upper end of the tubular standard 53, in which is rotatably supported the before-mentioned shaft 31. The outer ends of the arms 51 are provided with weights, which normally gravitate to rock the shaft 37 and withdraw the clutch disk 28 from engagement with the disk 21, and thus throw the motor 34 out of driving connection. When the motor is started and the shaft 19 driven through the gears 30, 31, and 33, the tubular shaft 31 will be rotated and the weighted arms 51 thrown out by centrifugal force, with the result that the shaft 35 will be forced down, by the inner ends of the arms 51, and the clutch disk 28 moved into the recess of the disk 21, and frictionally engaged therewith. The disk 21 will thus be rotated, and by the engagement of its pawl with the notch of the boss of the disk 22, the disk 22 will be driven, so as to communicate its rotary movement to the propeller shaft 10, through the gear 17.

It will be noted that when the two motors are running properly that the propeller shaft will be driven by the gears 26 and 41, but should the motor 34, for instance, cease in its driving function, the gear 17 will be driven by the gear 41, and through this gear 17, the gear 26 will be rotated independently of the disk 21, or rather at a greater speed, so that the notched boss of the disk 22 will move around under the pawl 23, with the result that there will be no drag on the motor 34', or other driving motor, will be prevented.

It will also be noted that when the motor 34 ceases to properly function, that the radial weighted arms of its governor will fall and move the clutch disk from the disk 22'.

What is claimed is:

1. In an aeroplane driving mechanism, a propeller shaft having a gear, a pair of motors each including a divided shaft one portion of which has a gear engaged with the propeller shaft gear, a clutch element on the last-named gear, a governor for each motor including a rotatable hollow shaft, a rod slidable through the hollow shaft, driving connections between the divided shaft and the hollow shaft, a rock shaft, a clutch element slidable on the gear carried portion of the divided shaft, connections between the slidable rod and the rock shaft, and connections between the sliable, element and the rock shaft.

2. A driving mechanism including a driven shaft, a divided drive shaft one portion of which is operatively connected with the driven shaft, a fixed clutch element on the said portion of the drive shaft, a movable clutch element on the said portion of the drive shaft, a governor including a reciprocable rod, a rock shaft, radial arms carried by the rock shaft one of which is operatively connected with and movable by said rod, and a link connected with the other radial arm and with the movable clutch element.

In testimony whereof, I affix my signature, in the presence of two witnesses.

ALFRED NUANES.

Witnesses:
S. J. Connor,
B. C. Ahlgrim.